United States Patent [19]
Fitzpatrick

[11] 3,732,746
[45] May 15, 1973

[54] TRANSMISSION CONTROL LEVER ASSEMBLY

[75] Inventor: John D. Fitzpatrick, Warren, Mich.

[73] Assignee: General Motors Corporation, Detroit, Mich.

[22] Filed: July 29, 1971

[21] Appl. No.: 167,329

[52] U.S. Cl. .................................. 74/473 R, 74/523
[51] Int. Cl. ............................................. G05g 9/00
[58] Field of Search ................... 74/473 P, 473 R, 74/523; 180/77 R, 90.6

[56] References Cited

UNITED STATES PATENTS

| | | | |
|---|---|---|---|
| 2,100,642 | 11/1937 | Geyer | 74/473 P |
| 3,315,537 | 4/1967 | Keller | 74/473 P UX |
| 3,527,114 | 9/1970 | Martz | 74/473 R |

*Primary Examiner*—Milton Kaufman
*Attorney*—W. E. Finken et al.

[57] ABSTRACT

A control lever adjustably mounted on a transmission extends through an opening formed in the floor of a vehicle and through a floor-mounted insulator closing the opening. The insulator is preferably a molded block of resilient material that lowers the intensity of any sound waves passing therethrough to the interior of the vehicle while yielding to allow all necessary control movements of the lever. The insulator yieldably grips a portion of the lever above its mounting so that vibrations imparted to the lever are damped by the flexing of the material of the insulator. Preferably the lever has parts separated by vibration damping members to further reduce lever vibration.

4 Claims, 3 Drawing Figures

PATENTED MAY 15 1973 3,732,746
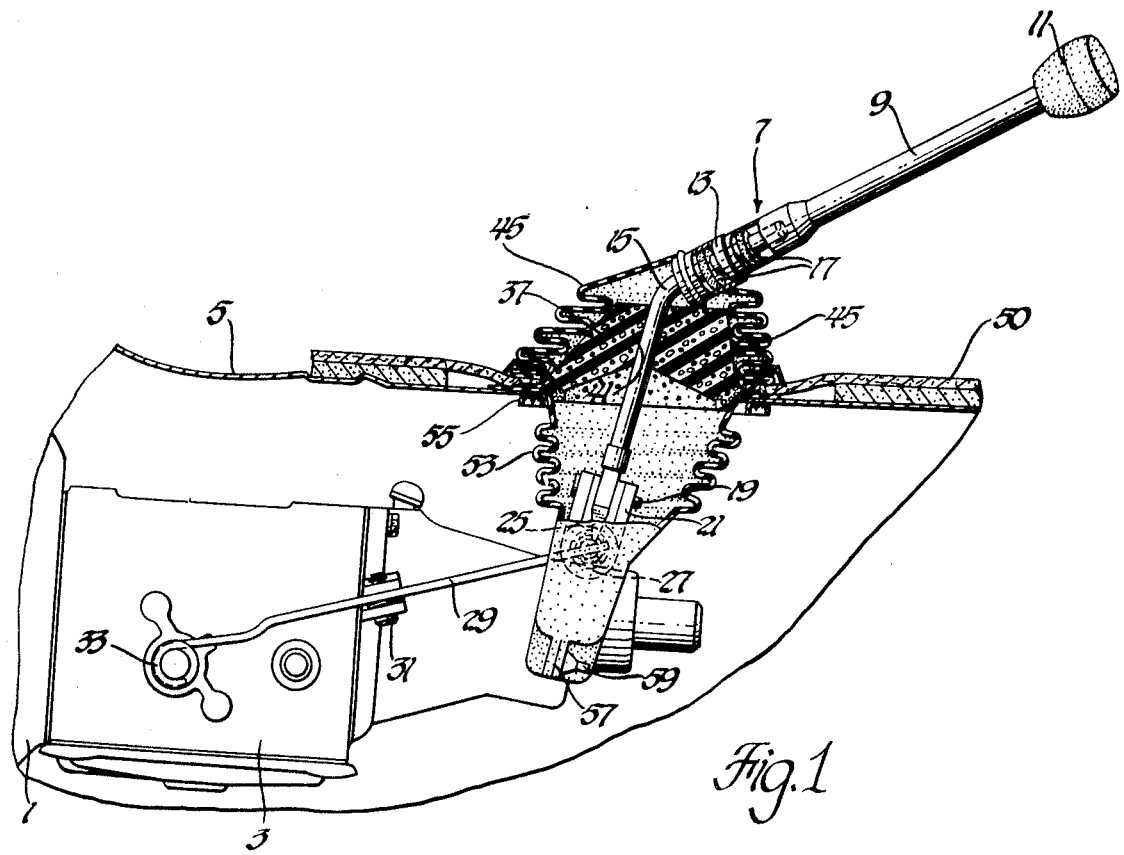
Fig.1
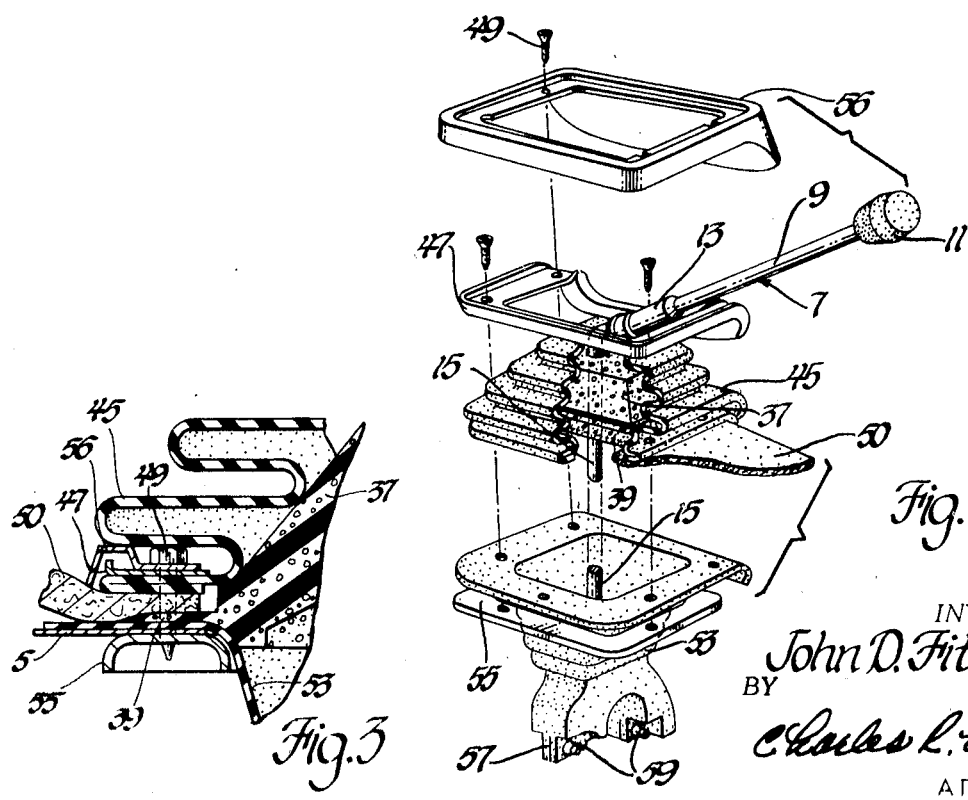
Fig.2
Fig.3
INVENTOR.
John D. Fitzpatrick
BY
Charles L. White
ATTORNEY

TRANSMISSION CONTROL LEVER ASSEMBLY

This invention relates to transmission controls and more particularly to a transmission control lever assembly featuring new and improved vibration damping and sound attenuating construction.

In transmission controls there are numerous devices for reducing the vibration and rattle of the manually operated control lever. Such devices, while effective to reduce lever vibration or buzz, do not effectively absorb or attenuate noise entering the passenger car compartment through the enlarged opening in the vehicle floor through which the manual shift lever extends.

In this invention there is a shift lever assembly provided with special resilient vibration dampers which drivingly interconnect two parts of a shift lever to reduce the transmittal of vibratory energy from the transmission via the upper and lower parts directly into the passenger compartment. Cooperating with this is a resilient insulator, which is preferably secured to the floor of the vehicle, to completely block the opening for the transmission control lever to substantially lower the intensity of sound entering the compartment through the opening. The insulator also provides a yieldable gripping force to hold the lever to damp mechanical vibrations imparted to the lower part of the lever by the transmission, engine or other source. The gripping force is applied to a part of the lower lever above the pivot mounting thereof so that vibrator energy imparted to the lever will be effectively damped by the material forming the insulator.

It is a feature and object of this invention to provide a new and improved control lever assembly for a transmission having a resilient insulator which covers a lever opening and which grips a part of the manual lever that is spaced from its pivot support to effectively damp lever vibrations and to attenuate sound entering into a passenger compartment through the opening.

Another feature and object of this invention is to provide a new and improved transmission control lever assembly having a sound absorbing insulator formed by a block of resilient material which closes an opening in a vehicle for accommodating the manual lever; the insulator has an elongated passage therein through which the lever extends and the side walls forming the passage grip the lever so that the insulator yieldably holds the lever and can flex to reduce vibratory energy imparted thereto.

These and other objects of this invention will become more apparent from the following detailed description and drawing in which:

FIG. 1 is a side view of a transmission control assembly partly in cross section.

FIG. 2 is an exploded view of the transmission control assembly of FIG. 1.

FIG. 3 is an enlarged view of a portion of FIG. 1.

Turning now in greater detail to the drawings there is shown in FIG. 1 a vehicle power package formed by engine 1 and change-speed transmission 3, which extends into the tunnel 5 formed in the floor of a vehicle. The floor has a generally rectangular opening formed therein through which a transmission manual lever 7 extends. This opening has sufficient dimensions to allow free movement of the lever in conditioning the transmission for its different forward and reverse speed ratios. This lever has an upper part 9 which has fixed at its outer end a knob or handle 11 and has a bell-shaped lower portion 13 into which the end of a lower part 15 extends. Axially spaced vibration damping rings 17 mounted on the end of the lower part 15 of the lever that extends into the bell-shaped portion 13 drivingly connect the two lever parts so that a force applied to upper part 9 to change gear ratios is transmitted to the lower part. The rings are preferably of a polyurethane resin having internal damping characteristics that dampen lever vibrations and thereby reduce the transmittal of vibratory energy between the lower and upper parts of the lever. The lower part 15 of the lever is mounted by pivot 19 for turning movement with respect to an axis formed by the pivot 19 on a control lever retainer 21. This retainer is in turn pivoted by pivot pins to upstanding projections formed on the case of the transmission 3. The lower part 15 of the lever terminates in a shaft finger 25, which fits into a shaft 27 that is connected to one end of a selector lever 29. This selector lever is pivoted to the transmission case by pivot 31 so that it can be turned into and out of the plane of the drawing to operate a selector shaft 33 that is operatively connected to the far end of the lever and which extends into the transmission case for selecting particular gear ratios. The shifter shaft for shifting the transmission gear ratios extends from the intermediate shaft 27, and being disposed on the other side of the transmission 3, is not shown in the drawing.

In this invention there is a special insulator 37 preferably a cellular foam product such as a molded block of urethane foam material having high internal damping properties to convert vibratory energy into heat. The insulator 37 is formed with a peripheral flange 39, which is secured to the edge of the tunnel 5 that forms the opening. This resilient block-like insulator projects upwardly from this flange and has side walls of a suitable thickness to effectively attenuate engine, transmission and other sounds, which enter into the passenger compartment through the opening. The insulator is formed with an elongated passage 41 through which the part 15 of lever 7 extends. The annular wall forming this passage 41 provides an interior gripping surface, which contacts a portion of the lower part 15 of the lever 7 above the pivot 19 to yieldably hold and effectively reduce lever vibration. To provide for protection of the insulator there is an elastomeric, convoluted upper boot 45, which has a reduced neck portion that is fitted around the bell-shaped portion 13 of the upper part 15 of lever 7. As best shown in FIGS. 2 and 3 the upper boot 45 is secured to the floor by a retainer 47 that frames the lower convolution of the boot and by screws 49. These screws extend through the retainer 47, the lower convolutions of the boot 45, the floor carpeting 50, the flange 39 of the insulator 37, the flared edge of a convoluted lower boot 53 of elastomeric material, the edge of the floor forming the opening for lever 7 and into a lower frame-like retainer 55 disposed beneath the floor forming the tunnel. A bezel 56 is disposed over the retainer 47 and is also secured to the lower retainer by the screws 49 to provide a finely finished appearance. The lower boot is of an elastomeric material and prevents the entry of water, dirt and foreign material into the control assembly. This boot has a saddle portion that fits around the transmission as best shown in FIG. 2. This portion of the lower boot is split at 57 to facilitate installation. Suitable fasteners 59 secure these split parts together.

The insulator 37 in its preferred form, is in the general shape of a truncated cone. The upwardly extending cylindrical passage 41 is formed with a cross sectional area slightly smaller than the cross sectional area of cylindrical lower part of the lever so that the lever is gripped on all contact surfaces by the walls of the passages and yieldably held in position. The insulator has sufficient elasticity to permit the manual lever to be easily moved by the vehicle operator to the various positions necessary in changing the transmission speed ratios. For example, the lever 9 can be moved both longitudinally and laterally in an H pattern to actuate the selector lever 29 and other controls with the insulator flexing to accommodate the movement and without taking a permanent set. By the yieldable gripping of the upper portion of the lower part 15 of lever 7, the insulator effectively damps mechanical vibrations imparted to the lever by the high molecular friction of the material of the insulator and by the passage of air into and out of the pores of the material of the insulator. Air is pressed out of the pores of the insulator material on compression and drawn into the pores on expansion. Lever vibrations are further reduced by the internal damping provided by polyurethane rings 17. Since the insulator has reduced vibration, the rings 17 are more effective as vibration dampers than if used alone since their damping is quite high at small amplitudes. Since the opening provided in the vehicle floor is closed by the insulator, sound waves are greatly attenuated in their passage through the material. This absorption of sound energy provides for a more pleasing environment for the operator and passengers within the vehicle. The insulator further provides thermal insulation and can be easily removed and replaced after termination of its service life.

Although a particular embodiment of this invention has been shown and described, it will be understood that other embodiments will be readily apparent to those skilled in the art so that this invention is not to be limited to particular illustrations and disclosures but by the following claims:

What is claimed is:

1. In combination a vehicle having a floor with an opening therein, a change speed transmission disposed beneath said floor, a manual lever operatively connected to said transmission which extends through said opening, support means disposed beneath said floor for supporting said manual lever for limited pivotal movement to change the transmission speed ratios, a vibration and sound-attenuating insulator operatively disposed in said opening and completely filling said opening for reducing the intensity of sound energy passing through said opening from beneath the vehicle floor to the space above the floor, said insulator being formed by a block of resilient material which extends above said floor, said insulator having a centralized and elongated passage extending generally upwardly therethrough for receiving said lever so that vibratory energy imparted thereto is converted into heat energy by the internal damping properties of said insulator, said passage in the relaxed state being smaller in cross-section than the cross-section of said lever so that said lever is peripherally gripped by the wall in said insulator forming said passage, and fastener means for securing said insulator to said vehicle floor.

2. In a vehicle, a change-speed transmission, a floor extending above said transmission, lever means operatively connected to said transmission, support means disposed below said floor for mounting said lever means for longitudinal and lateral movement in conditioning said transmission for different speeds, an opening formed in said floor through which said lever means extends, a unitary block-like insulator of resilient material secured to said floor to seal said opening to reduce the transmission of sound energy therethrough, said insulator extending upward from said floor and terminating in an upper portion having an upwardly extending passage formed therethrough for receiving said lever means, said passage being smaller in cross-section than the cross-section of said lever to peripherally surround and grip said lever means at points above said floor means so that vibratory energy imparted to said lever means is converted into heat by the internal damping of said insulator 3. In combination, a control lever, support means for mounting said lever for movement to predetermined positions, a partition disposed above said support means having an opening through which said control lever extends, a sound-attenuating and vibration-damping insulator fixed in and completely closing said opening for reducing the transmission of sound therethrough, said insulator being a block of resilient foam material extending upwardly from said partition having an upwardly extending opening therein which extends peripherally around a portion of said lever to yieldably grip said portion of the lever at points above said support means for damping vibrations imparted thereto, fastener means securing said insulator to said floor and elastomeric boot means disposed around said opening and said insulator and secured to said lever to provide a protective covering therefor.

4. In combination, a transmission, a control lever operatively connected to said transmission, support means mounting said lever for limited movement, a partition, an opening in said partition through which said lever extends, a unitary block-like insulator of resilient material fixed to said partition for closing said opening to reduce the passage of sound from said transmission and the areas beneath the partition to the area above said partition, said insulator extending upwardly from said partition and having an elongated neck portion disposed above said partition through which said lever extends, said neck portion having a cross-sectional shape that in a relaxed state is smaller in area than the cross-sectional shape of said lever which yieldably grips said lever to permit said lever to be moved to various predetermined positions to change the speed ratios of said transmission and to resiliently hold said lever in position to damp any vibrations imparted thereto by said transmission and other sources of vibratory energy, said lever being formed from first and second portions, and resilient ring means operatively disposed between said first and second portions to transmit a manual force applied to one end thereof and to damp vibrations imparted to either of said portions.

* * * * *